United States Patent
McCann et al.

(10) Patent No.: US 8,761,764 B2
(45) Date of Patent: Jun. 24, 2014

(54) SYSTEMS, METHODS, AND COMPUTER READABLE MEDIA FOR TRIGGERLESS MOBILE LOCATION-BASED ROUTING / SCREENING

(75) Inventors: Thomas M. McCann, Raleigh, NC (US); Peter Nas, The Hague (NL); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1058 days.

(21) Appl. No.: 12/534,766

(22) Filed: Aug. 3, 2009

(65) Prior Publication Data

US 2010/0029272 A1 Feb. 4, 2010

Related U.S. Application Data

(60) Provisional application No. 61/085,666, filed on Aug. 1, 2008.

(51) Int. Cl.
*H04W 4/00* (2009.01)
(52) U.S. Cl.
USPC .......................................... 455/433; 455/445
(58) Field of Classification Search
USPC .................... 455/433, 445, 456.1, 564, 456.2
See application file for complete search history.

(56) References Cited

U.S. PATENT DOCUMENTS

| | | |
|---|---|---|
| 5,579,371 A | 11/1996 | Aridas et al. |
| 5,724,658 A | 3/1998 | Hasan |
| 5,805,689 A | 9/1998 | Neville |
| 5,905,952 A | 5/1999 | Joensuu et al. |
| 5,915,222 A | 6/1999 | Olsson et al. |
| 6,006,098 A | 12/1999 | Rathnasabapathy et al. |
| 6,047,327 A | 4/2000 | Tso et al. |
| 6,052,591 A | 4/2000 | Bhatia |
| 6,091,958 A | 7/2000 | Bergkvist et al. |
| 6,091,959 A | 7/2000 | Souissi et al. |

(Continued)

FOREIGN PATENT DOCUMENTS

| | | |
|---|---|---|
| CN | 1223774 A | 7/1999 |
| DE | 198 05 261 A1 | 8/1999 |

(Continued)

OTHER PUBLICATIONS

Communication regarding the expiry of the time limit within which notice of opposition may be filed for European Application No. 02786968.4 (Feb. 3, 2012).

(Continued)

*Primary Examiner* — Myron K Wyche
(74) *Attorney, Agent, or Firm* — Jenkins, Wilson, Taylor & Hunt, P.A.

(57) ABSTRACT

Methods, systems, and computer readable media for performing triggerless mobile location-based screening and routing are disclosed. According to one aspect, the subject matter described herein includes a method for performing triggerless mobile location-based screening and routing. A telecommunications network element receives a mobility management message associated with a mobile subscriber, extracts from the mobility management message information identifying the mobile subscriber and location information associated with the mobile subscriber, and stores the extracted location information associated with the mobile subscriber. The network element receives a call setup message associated with a call from the mobile subscriber, extracts from the call setup message information identifying the mobile subscriber, retrieves the stored location information associated with the mobile subscriber, and performs a screening or routing function based on the location information associated with the mobile subscriber.

26 Claims, 9 Drawing Sheets

(56) References Cited

U.S. PATENT DOCUMENTS

| | | | |
|---|---|---|---|
| 6,097,960 | A | 8/2000 | Rathnasabapathy et al. |
| 6,101,387 | A | 8/2000 | Granberg et al. |
| 6,119,014 | A | 9/2000 | Alperovich et al. |
| 6,122,510 | A | 9/2000 | Granberg |
| H1895 | H | 10/2000 | Hoffpauir et al. |
| 6,134,438 | A | 10/2000 | Sawyer |
| 6,144,663 | A | 11/2000 | Hallenstal |
| 6,151,505 | A | 11/2000 | Larkins et al. |
| 6,175,743 | B1 | 1/2001 | Alperovich et al. |
| 6,198,923 | B1 | 3/2001 | Buettner |
| 6,198,933 | B1 | 3/2001 | Lundin |
| 6,219,551 | B1 | 4/2001 | Hentilä et al. |
| 6,324,399 | B1 | 11/2001 | Salmivalli |
| 6,327,350 | B1 | 12/2001 | Spangler et al. |
| 6,381,456 | B1 | 4/2002 | Ko |
| 6,381,465 | B1 | 4/2002 | Chern et al. |
| 6,400,943 | B1 | 6/2002 | Montoya |
| 6,411,632 | B2 | 6/2002 | Lindgren et al. |
| 6,456,845 | B1 | 9/2002 | Drum et al. |
| 6,505,046 | B1 | 1/2003 | Baker |
| 6,505,050 | B1 | 1/2003 | Brudos et al. |
| 6,563,917 | B2 | 5/2003 | Sabinson et al. |
| 6,567,658 | B1 | 5/2003 | Van De Graaf |
| 6,574,481 | B1 | 6/2003 | Rathnasabapathy et al. |
| 6,578,085 | B1 | 6/2003 | Khalil et al. |
| 6,611,687 | B1 | 8/2003 | Clark et al. |
| 6,622,016 | B1 | 9/2003 | Sladek et al. |
| 6,650,902 | B1 | 11/2003 | Richton |
| 6,662,017 | B2 | 12/2003 | McCann et al. |
| 6,735,441 | B1 | 5/2004 | Turgeon et al. |
| 6,738,362 | B1 | 5/2004 | Xu et al. |
| 6,915,325 | B1 | 7/2005 | Lee et al. |
| 6,952,582 | B2 | 10/2005 | Murai |
| 6,959,076 | B2 | 10/2005 | Chang et al. |
| 6,990,347 | B2 | 1/2006 | McCann |
| 7,113,781 | B1 | 9/2006 | Allison et al. |
| 7,222,192 | B2 | 5/2007 | Allison et al. |
| 7,302,052 | B2 | 11/2007 | Fleischer, III et al. |
| 2002/0025821 | A1* | 2/2002 | Clapton et al. ............ 455/456 |
| 2002/0026527 | A1 | 2/2002 | Das et al. |
| 2002/0037750 | A1 | 3/2002 | Hussain et al. |
| 2002/0050927 | A1 | 5/2002 | De Moerloose et al. |
| 2002/0057780 | A1 | 5/2002 | Gruchala et al. |
| 2002/0065086 | A1 | 5/2002 | Vanttinen et al. |
| 2003/0129991 | A1* | 7/2003 | Allison et al. ............ 455/456 |
| 2003/0161457 | A1 | 8/2003 | Sabinson et al. |
| 2004/0132449 | A1 | 7/2004 | Kowarsch |
| 2004/0203756 | A1 | 10/2004 | Lin et al. |
| 2005/0043036 | A1 | 2/2005 | Ioppe et al. |
| 2005/0090225 | A1 | 4/2005 | Muehleisen et al. |
| 2005/0220288 | A1 | 10/2005 | Huey |
| 2007/0032247 | A1 | 2/2007 | Shaffer et al. |
| 2007/0293187 | A1* | 12/2007 | Pennock ............ 455/404.2 |
| 2008/0233935 | A1 | 9/2008 | Garg |
| 2010/0094703 | A1 | 4/2010 | Bramley et al. |
| 2011/0038287 | A1 | 2/2011 | Agarwal et al. |

FOREIGN PATENT DOCUMENTS

| | | |
|---|---|---|
| EP | 0 710 043 A1 | 5/1996 |
| EP | 1 472 809 B1 | 3/2011 |
| WO | WO 99/40748 | 8/1999 |
| WO | WO 00/74409 A1 | 12/2000 |
| WO | WO 01/67782 A2 | 9/2001 |
| WO | WO 03/061159 A1 | 7/2003 |

OTHER PUBLICATIONS

Communication of European publication number and information on the application of Article 67(3) EPC for European Application No. 09803708.8 (Mar. 23, 2011).

Communication under Rule 71(3) EPC for European Application No. 02786968.4 (Oct. 26, 2010).

Notification of Transmittal of the International Search Report and the Written Opinion of the International Searching Authority, or the Declaration for International Application No. PCT/US2009/052604 (Apr. 12, 2010).

Decision to refuse a European Patent application for European Application No. 01922340.3 (Feb. 11, 2009).

Provision of the minutes in accordance with Rule 124(4) EPC for European Application No. 01922340.3 (Feb. 11, 2009).

Communication pursuant to Article 94(3) EPC for European Application No. 02786968.4 (Sep. 29, 2008).

Summons to attend oral proceedings pursuant to Rule 115(1) EPC for European Application No. 01922340.3 (Jul. 22, 2008).

Supplementary European Search Report for European Application No. 02786968.4 (May 15, 2008).

Communication pursuant to Article 96(2) EPC for European Application No. 01922340.3 (Oct. 23, 2007).

Notice of Allowance and Fee(s) Due for U.S. Appl. No. 10/044,203 (Mar. 13, 2007).

Final Official Action for U.S. Appl. No. 10/044,203 (Aug. 8, 2006).

Notice of Allowance and Fee(s) Due for U.S. Appl. No. 09/649,461 (Jul. 31, 2006).

Decision on Appeal for U.S. Appl. No. 09/649,461 (Jul. 13, 2006).

Examiner's Answer for U.S. Appl. No. 09/649,461 (Feb. 17, 2006).

Non-Final Official Action for U.S. Appl. No. 10/044,203 (Jan. 10, 2006).

Order Returning Undocketed Appeal to Examiner for U.S. Appl. No. 09/649,461 (Nov. 7, 2005).

Non-Final Official Action for U.S. Appl. No. 10/044,203 (Apr. 20, 2005).

Examiner's Answer for U.S. Appl. No. 09/649,461 (Apr. 19, 2005).

Opposition in European Patent Application No. 1 308 054 (Dec. 3, 2004).

Advisory Action for U.S. Appl. No. 09/649,461 (Nov. 18, 2004).

Final Official Action for U.S. Appl. No. 09/649,461 (Mar. 30, 2004).

International Preliminary Examination Report for International Application No. PCT/US01/07828 (Oct. 8, 2003).

Non-Final Official Action for U.S. Appl. No. 09/649,461 (Jul. 28, 2003).

Final Official Action for U.S. Appl. No. 09/649,461 (Apr. 11, 2003).

Notification of Transmittal of the International Search Report or the Declaration for International Application No. PCT/US02/39265 (Feb. 14, 2003).

Notification of European Publication Number and Information on the Application of Article 67(3) EPC for European Application No. 01922340.3 (Nov. 6, 2002).

Non-Final Official Action for U.S. Appl. No. 09/649,461 (Oct. 18, 2002).

Sprague, "Tekelec's Transport Adapter Layer Interface," RFC 3094, pp. 1-106 (Apr. 2001).

"Universal Mobile Telecommunications System (UMTS); Super-Charger Technical Realization; Stage 2", ETSI TS 123 116, V4.0.0 (Mar. 2001). pp. 1-29 (Mar. 2001).

Stewart et al., "Stream Control Transmission Protocol," RFC 2960, pp. 1-134 (Oct. 2000).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 1 of 4, pp. 1-285).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 2 of 4, pp. 286-571).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 3 of 4, pp. 571-857).

"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 4 of 4, pp. 858-1145).

"3rd Generation Partnership Project; Technical Specification Group Core Network; Gateway Location Register (GLR)—Stage 2 (Release 1999)," 3G TS 23.119 V3.0.0, pp. 1-129 (Mar. 2000).

(56) References Cited

OTHER PUBLICATIONS

"Universal Mobile Telecommunications System (UMTS); Supercharger; Stage 2 (3G TS 23.116 version 3.0.0 Release 1999)," ETSI TS 123 116 V3.0.0 (Mar. 2000).
"Digital Cellular Telecommunications System (Phase 2+); Technical Realization of the Short Message Service.(SMS); (GSM 03.40 version 7.4.0 Release 1998)," ETSI TS 100 901, V7.4.0 (Dec. 1999).
Digital Cellular Telecommunications System (Phase 2+); Location Registration Procedures, (GSM 03.12 version 7.0.0 Release 1998), ETSI TS 100 530, V7.0.0 (Aug. 1999).
Bertrand, "Jambala Mobility Gateway-Convergence and Inter-System Roaming," Ericsson Review, No. 2, pp. 89-93 (1999).
Urs, "Roaming Notification and Local Service Control Through Short Message Service," Motorola Technical Developments, vol. 34, pp. 17-19 (Mar. 1, 1998).
A30808-X3245-X32-1-7618 (Information, Network Element, Home Location Register Authentication Center, Siemens 1998).
"IP7 Secure Gateway," Release 1.0, Tekelec, Release Documentation 910-2046-01 Revision A (Nov. 1999).
"Feature Guide Eagle STP," Tekelec, P/N 910-1225-01, Revision B (Jan. 1998).
Yamaguchi et al., "Inter-system mobility and service management in GSM/PDC roaming," IEEE, pp. 694-698 (Nov. 1997).
"Digital Cellular Telecommunications System (Phase 2+); Mobile Application Part (MAP) Specification (GSM 09.02)," ETS 300 974 (May 1997).
A30808-X2769-X7-3-7618 (Information, Signaling, Overview CCNC, Siemens AG 1997).
Eagle Feature Guide, P/N 910-1225-01, Revision A, Tekelec, Mar. 1996.
A30808-X3245-X17-1-7618 (Information, Network Element, Mobile-Service Switching Center, Visitor Location Register, Siemens AG 1996).
A30808-X3245-X19-1-7618 (Information, Network Element, Equipment Identity Register, Siemens AG 1995).
A30808-X3245-X18-1-7618 (Information, Network Element, Home Location Register, Authentication Center, Siemens AG 1995).
A30808-X2769-X6-1-7618 (Information, Signaling, Overview CCNC, Siemens AG 1995).
Chatras et al., "Mobile Application Part Design Principles," International Switching Symposium, pp. 1-9 (1990).
Final Office Action for U.S. Appl. No. 12/853,901 (Oct. 15, 2013).
Extended European Search Report for European Application No. 09803708.8 (Oct. 11, 2013).
Applicant-Initiated Interview Summary for U.S. Appl. No. 12/853,901 (Sep. 6, 2013).
Non-Final Office Action for U.S. Appl. No. 12/853,901 (Apr. 29, 2013).
Restriction and/or Election Requirement for U.S. Appl. No. 12/853,901 (Jan. 22, 2013).
First Office Action for Chinese Application No. 200980138920.7 (Apr. 24, 2013).

\* cited by examiner

SYSTEMS, METHODS, AND COMPUTER READABLE MEDIA FOR TRIGGERLESS MOBILE LOCATION-BASED ROUTING / SCREENING

PRIORITY CLAIM

This application claims the benefit of U.S. Provisional Patent Application Ser. No. 61/085,666, filed Aug. 1, 2008; the disclosure of which is incorporated herein by reference in its entirety.

TECHNICAL FIELD

The subject matter described herein relates to methods and systems for screening and routing of signaling messages within a telecommunications network. More particularly, the subject matter described herein relates to triggerless mobile location-based routing/screening.

BACKGROUND

A telecommunications networks become more capable, merging traditional public switched telephone networks (PSTNs) with packet networks, such as the Internet, the distinction between a "local" call and a "long-distance" call has blurred. Even before the rise in availability of access to the Internet, telephone service providers offered nation-wide numbers, such as toll-free 1-800 numbers (and not toll-free 1-900 numbers.) A nation-wide number may be dialed from anywhere in the country—the caller does not know and may not care about where the call is actually being routed. Subscribers to advanced telecommunications networks have access to an ever wider variety of services, including services that are possibly located literally on the other side of the planet from the subscriber. Having nearly instantaneous access to services via computer networks allowed businesses to locate the physical resources that provide these services, e.g., computers, servers, web servers, etc., literally anywhere in the world. This further obliterates the distinction between what is local to a subscriber and what is not. A computer user visiting a website may have no clue whether the web server is located next door or on another continent, for example, and it may not make any difference at all to the user.

There are, however, some circumstances when it is important for a subscriber to know whether the person he or she is contacting over the telecommunications network is geographically close by or far away. For example, when a subscriber needs to contact the police or an ambulance by dialing an emergency contact number, such as 911 in the United States, it is important that the caller is connected to a local entity. Likewise, when a subscriber dials a 1-800 number, to order an item from a catalog, for example, the user may not care to which geographic location the call is routed. On the other hand, however, when the user is trying to call a local pizza delivery restaurant which offers a 1-800 number, a user in one state does not want to be connected to a delivery restaurant in another state, or even in another county, but wants to be connected to restaurant that will deliver to his or her location.

This gave rise to the need for location-based routing, i.e., routing a call based on the geographic location of the calling or called party. While it is relatively easy to determine the geographic location of a calling party, for example, if the calling party is using a wireline or land-line, it is more difficult to determine the location of a party who is calling from a mobile phone, which, by definition, is not tied to any particular geographic location.

Furthermore, conventional approaches to providing location-based routing for wireline telephones involves provisioning the end offices or service switching points to generate a trigger that initiates the location-based routing function. This is referred to as a "triggered" implementation of location-based routing. Provisioning all of the end offices with triggers is potentially very expensive, and may not be supported by some older equipment. In addition, conventional location-based routing uses the directory number of the subscriber to indicate the geographic location of the subscriber. Although this is satisfactory for wireline subscribers, this method fails to provide useful location information for mobile subscribers, whose directory number stays the same but whose geographic location may be anywhere within the region, country, continent, or even world.

Accordingly, in light of these disadvantages associated with conventional triggered location-based screening, there exists a need for triggerless mobile location-based routing and screening.

SUMMARY

According to one aspect, the subject matter described herein includes a method for performing triggerless mobile location-based screening and routing. A telecommunications network element receives a mobility management message associated with a mobile subscriber, extracts from the mobility management message information identifying the mobile subscriber and location information associated with the mobile subscriber, and stores the extracted location information associated with the mobile subscriber. The network element receives a call setup message associated with a call from the mobile subscriber, extracts from the call setup message information identifying the mobile subscriber, retrieves the stored location information associated with the mobile subscriber, and performs a screening or routing function based on the location information associated with the mobile subscriber.

According to another aspect, the subject matter described herein includes a method for performing triggerless mobile location-based screening and routing. A telecommunications network element receives a call setup message that includes information identifying a calling party mobile subscriber; extracts from the call setup message the information identifying the calling party mobile subscriber, determines location information associated with the calling party mobile subscriber, and performs a screening or routing function based on the location information associated with the calling party mobile subscriber.

According to another aspect, the subject matter described herein includes a system for performing triggerless mobile location-based screening and routing. The system includes a telecommunications network element for receiving a mobility management message associated with a mobile subscriber, extracting information identifying the mobile subscriber and location information associated with the mobile subscriber from the message, and storing the extracted location information associated with the mobile subscriber. The network element is configured to receive a call setup message associated with a call from the mobile subscriber, retrieve the stored location information associated with the mobile subscriber, and perform a screening or routing function based on the location information associated with the mobile subscriber.

According to another aspect, the subject matter described herein includes a system for performing triggerless mobile location-based screening and routing. The system includes a telecommunications network element for receiving a call setup message associated with a calling party mobile subscriber, extracting from the call setup message information identifying the calling party mobile subscriber, using the information identifying the calling party mobile subscriber to retrieve, from a network entity for maintaining location information associated with mobile subscribers, location information associated with the calling party mobile subscriber, and performing a screening or routing function based on the location information associated with the calling party mobile subscriber.

The subject matter described herein for triggerless mobile location-based screening and routing may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for triggerless mobile location-based routing/screening.

Reference will now be made in detail to exemplary embodiments of the present invention, examples of which are illustrated in the accompanying drawings. Wherever possible, the same reference numbers will be used throughout the drawings to refer to the same or like parts.

Figure 1:
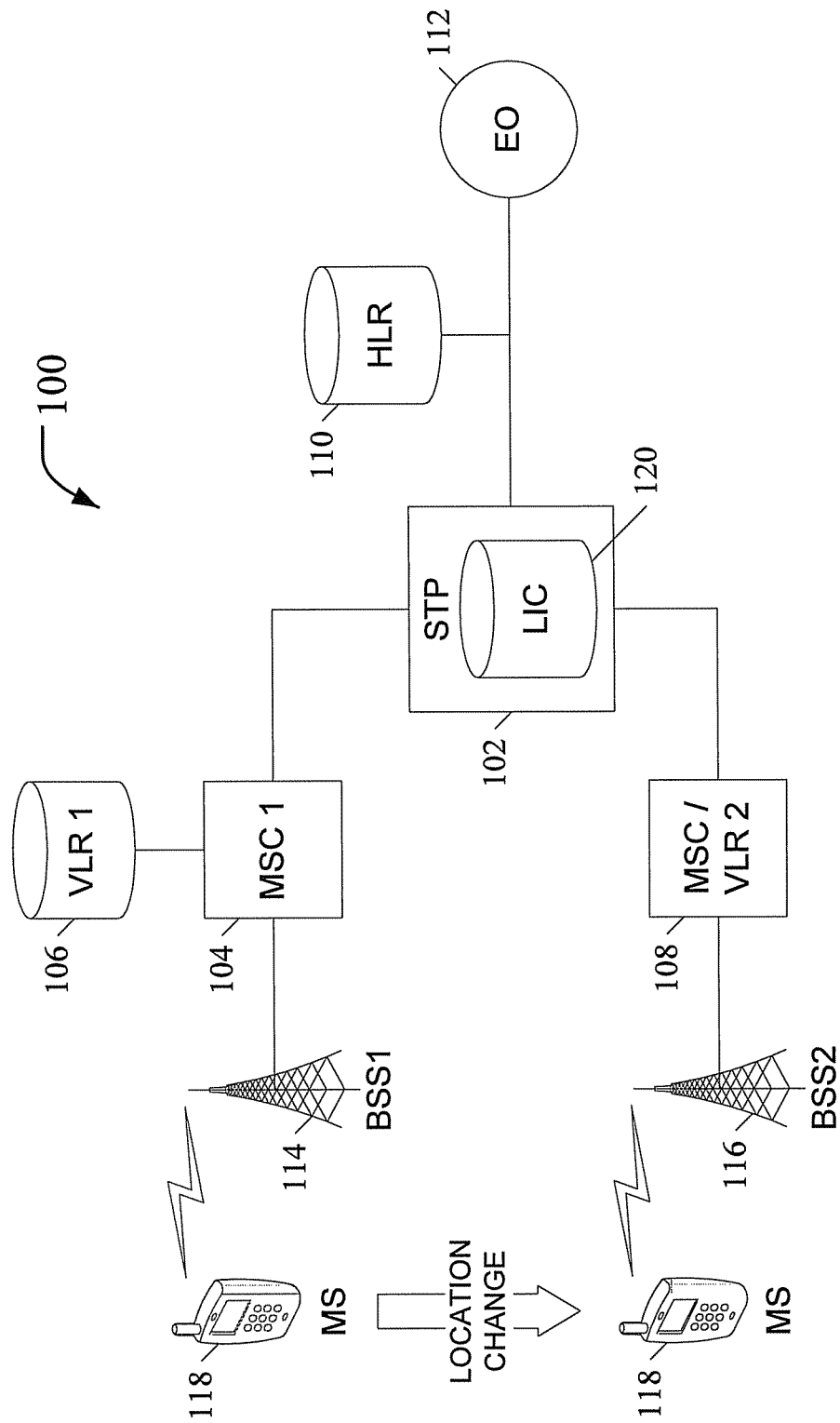
FIG. 1 is a block diagram illustrating an exemplary system for triggerless mobile location-based routing/screening according to an embodiment of the subject matter described herein.

FIG. 1 is a block diagram illustrating an exemplary system for triggerless mobile location-based routing/screening according to an embodiment of the subject matter described herein. Referring to FIG. 1, telecommunications network 100 includes several telecommunications elements, including a telecommunications network element 102 that receives signaling messages.

In the embodiment illustrated in FIG. 1, network element 102 is a system signaling 7 (SS7) network signal transfer point, or STP. In alternative embodiments, network element 102 may be: a signaling system 7 (SS7) signaling message routing node, such as an STP, media gateway controller (MGC), or softswitch; a session initiation protocol (SIP) node, such as a SIP proxy server or a SIP router; a SIP/SS7 gateway, an Internet protocol (IP) node, such as a router; an IP multimedia subsystem (IMS) node, such as an IMS call session control function (CSCF) node; a next generation network (NGN) node; and a signaling gateway node, such as a SIP/SS7 gateway.

In the embodiment illustrated in FIG. 1, STP 102 communicates with and routes signals among other network elements, such as a first mobile switching center (MSC1) 104, a first visitor location register (VLR1) 106, a combination mobile switching center and visitor location register MSC/VLR2 108, a home location register (HLR) 110, and an switching point or end office (EO) 112.

Mobile switching centers MSC1 104 and MSC/VLR2 108 are sophisticated telephone exchanges or switching offices that provide circuit-switched calling, mobility management, and GSM services to the mobile phones roaming within the area that they serve. An MSC is responsible for connecting calls together by switching the digital voice data packets from one network path to another—a process usually called 'call routing'. MSCs also provide additional information to support mobile service subscribers, including user registration, authentication, and location updating. An MSC may control multiple base station subsystems.

In the embodiment illustrated in FIG. 1, each MSC or MSC/VLR is associated with a base station subsystem. For example, MSC1 104 serves a first base station subsystem, BSS1 114, and MSC/VLR2 108 serves a second base station subsystem, BSS2 116. The base station subsystems provide the radio link between network 100 and one or more mobile subscribers, such as mobile subscriber (MS) 118.

Home location register 110 is the main database of permanent subscriber information for a mobile telecommunications network. HLRs maintain information about a mobile subscriber, such as the mobile subscriber's identity, the mobile subscriber's calling plan or services that the mobile subscriber is allowed to user or access, and the current location of the mobile subscriber, e.g., the address of the MSC and/or VLR that is currently serving the mobile subscriber.

Visitor location registers VLR1 106 and MSC/VLR2 108 are local databases maintained by cellular network providers to track users who are roaming in the provider's home territory. Upon entry into an area served by a VLR, the mobile subscriber equipment (e.g, the mobile phone) connects to the nearest BSS and communicates through the serving MSC to the VLR. The mobile subscriber equipment attempts to register with the VLR, meaning that the mobile subscriber equipment indicates its presence in the network. The VLR will then exchange handshaking messages with the subscriber's HLR, during which the HLR updates its records as to the current location of the mobile subscriber and also informs the VLR information about the mobile subscriber, including what services are available to that mobile subscriber.

These handshaking messages are commonly referred to as mobility management messages. Example mobility management messages include signaling system 7 (SS7) mobile application part (MAP) messages, such as an update location message, an insert subscriber data message, an any time interrogation message, a provide subscriber info message, and a send routing information message. An update location request message is a mobile application part (MAP) message that contains identification and location information about the subscriber. In the case of a GSM network, this could include the IMSI number, or other subscriber ID, the VMSC number, and the VLR number. An insert subscriber data message is a MAP message that provides specific subscriber data to update the serving subscriber management entity when there is either a change in a subscriber parameter, or upon a location updating of the subscriber. An any time interrogation message is a MAP message that allows a GSM service control function (SCF) to interrogate an HLR for location and/or subscriber information. A provide subscriber info message is a MAP message that may be used as part of the any time interrogation process. It is sent from the HLR to the serving MSC in order to retrieve subscriber state and location information. A send routing information message is a MAP message sent by a gateway MSC, or GMSC, to the HLR to request routing information in order to route a call towards a mobile subscriber.

For example, when a 2G cellular mobile subscriber turns on his or her handset, the handset registers with the cellular network, such as the global system for mobile communications (GSM) network. Registration may also occur when a mobile subscriber physically leaves one service area and enters another service area. In this case, the handset must register with the new network.

In the embodiment illustrated in FIG. 1, a single mobile subscriber, MS 118 is shown moving out of a geographic area served by BSS1 114 and into a geographic area served by BSS2 116. As mobile subscriber 118 changes location, the BSS that serves MS 118 changes, along with the corresponding VLR. In one embodiment, STP 102 monitors the mobility management messages that are exchanged between HLR 110 and various VLRs 106 and 108 that occur when MS 118 changes location. From these messages, STP 102 extracts the information identifying the mobile subscriber and the location information associated with the mobile subscriber and stores or caches the extracted information.

In the embodiment illustrated in FIG. 1, STP 102 includes a location information cache (LIC) 120 for storing the location information associated with mobile subscribers. In alternative embodiments, the location information database may be maintained, be co-located with, or be a component of: an SS7 node, such as an STP, a MGC, a service switching point (SSP), a mobile switching center (MSC), a SIP node, such as a SIP proxy server or a SIP registrar; an IP node; an IMS node, such as an IMS CSCF node; a NGN node; a signaling gateway node, such as a SIP/SS7 gateway; and a redirect server.

Figure 2:
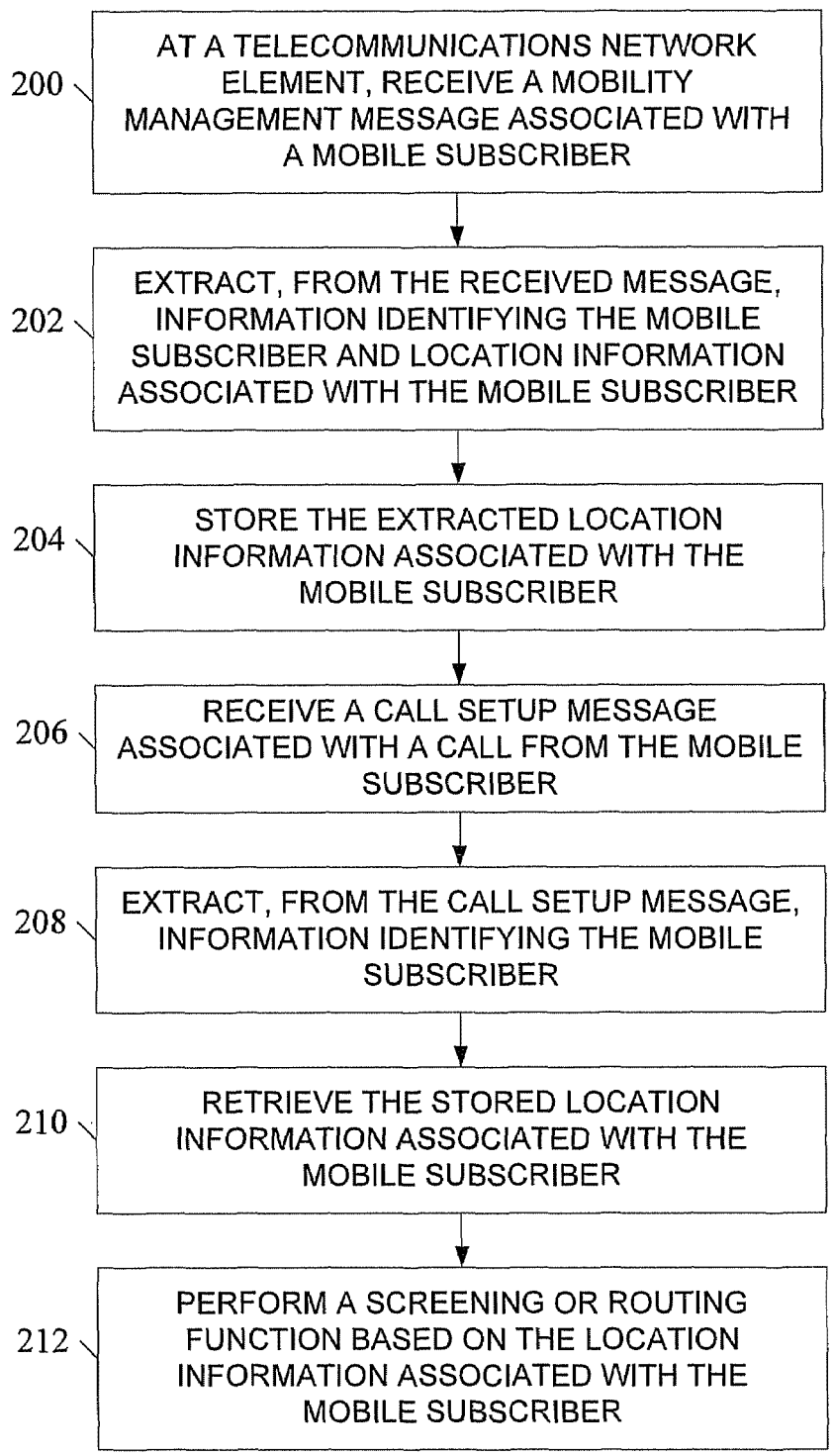
FIG. 2 is a flow chart illustrating an exemplary process for triggerless mobile location-based routing/screening according to an embodiment of the subject matter described herein.

FIG. 2 is a flow chart illustrating an exemplary process for triggerless mobile location-based routing/screening according to an embodiment of the subject matter described herein. This process will now be described with reference to the embodiments illustrated in FIGS. 1 and 2. Referring to FIG. 2, at block 200, a telecommunications network element receives mobility management messages associated with a mobile subscriber. For example, STP 102 may receive mobility management messages exchanged between VLR1 106 and HLR 110, or between MSC/VLR2 108 and HLR 110, related to registration of MS 118 or to location updates pertaining to MS 118.

In the embodiment illustrated in FIG. 1, mobility management messages may be generated as a result of mobile subscriber 118 changing location from the area served by BSS1 114 to the area served by BSS2 116. A detailed example of this process will be illustrated in FIG. 3, described below.

At block 202, information is extracted from the received mobility management messages, such as information identifying the mobile subscriber and location information associated with the mobile subscriber.

Examples of information identifying the mobile subscriber include the international mobile subscriber identity (IMSI), electronic serial number (ESN), mobile equipment identifier (MEID), and mobile subscriber integrated services digital network (ISDN) number (MSISDN).

Examples of location information include but are not limited to the identity of the serving MSC (MSC ID) or the serving VLR (VLR ID), a location area code (LAC), a cell identifier (CID), location information for a radio network element, and a radio network element identifier. In one embodiment, the subscriber may be associated with global positioning system (GPS) coordinates, such as the coordinates of the mobile phone (if the phone is equipped to report its GPS location) or the coordinates of the serving MSC, MSC/VLR, BSC or BTS, since these entities are geographically static with known positions, from which the position of the mobile handset may be inferred with some acceptably small margin of error.

At block 204, the extracted location information associated with the mobile subscriber is stored. For example, STP 102 may add an entry into location information cache 120, the entry associating the mobile subscriber with the location information. For the purposes of this disclosure, the term cache refers to a database, a lookup table, a data structure, a data store, a memory, or other means for storing and retrieving this information.

STPs are typically deployed in pairs. Thus, in one embodiment, STP 102 may be paired with another STP, which will hereinafter be referred to as a "sister STP". In such embodiments, any location information stored and used by STP 102 should be made available to the sister STP as well, since it is not guaranteed that each message sent as part of a mobility management event will be transmitted through the same STP. For example, the location update message may be routed through STP 102 but the insert subscriber data message may be routed through the sister STP instead of through STP 102. Therefore, in one embodiment, the location information may be replicated, synchronized, or shared between STP 102 and it sister STPs.

At block 206, a call setup message associated with a call from the mobile subscriber is received or intercepted by the telecommunications network element. For example, STP 102 may receive a call setup message originated by mobile subscriber 118 through BSS2 116. Examples of call setup messages include an ISDN service user part (ISUP) initial address message (IAM), a session initiation protocol (SIP) invite message, etc.

At block 208, the location information associated with the mobile subscriber is retrieved. For example, STP 102 may determine that the call setup message calling party is mobile subscriber 118, and query or otherwise search location information cache 120 for location information associated with mobile subscriber 118.

At block 210, a screening or routing function is performed, based on the location information associated with the mobile subscriber. For example, STP 102 may prevent mobile subscriber 118 from originating a mobile call if mobile subscriber 118 is roaming or is outside of an allowed network. In this example, STP 102 may screen (i.e., allow or deny) the call based on the mobile subscriber's location. In other example, STP 102 may route the call to one of a number of possible destinations based on which of the possible destinations is closest to the current location of calling mobile subscriber 118. A detailed example of a triggerless mobile location-based routing function is illustrated in FIG. 4, described below.

Figure 3:
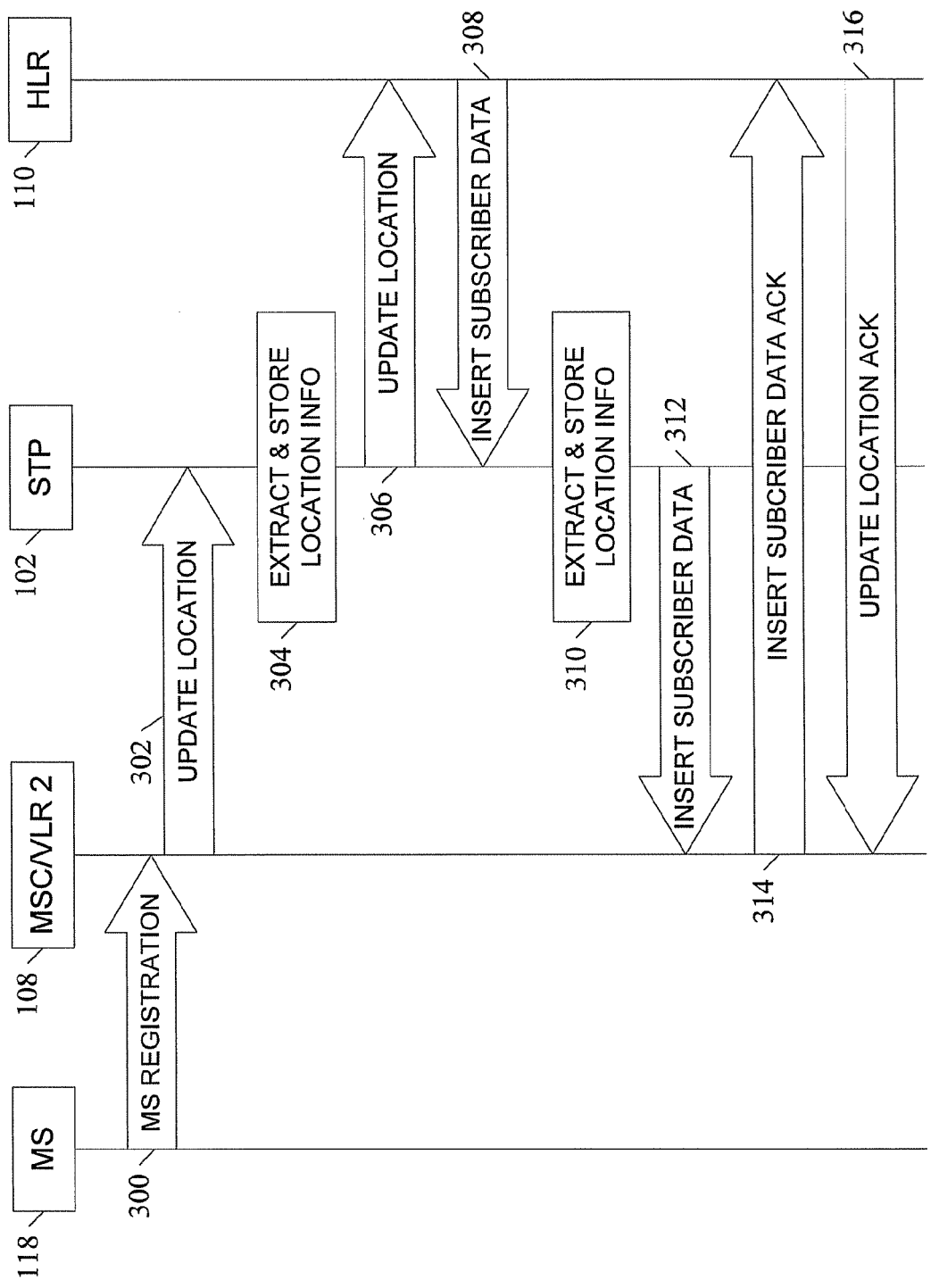
FIG. 3 is an exemplary call flow diagram (ladder diagram) illustrating signaling messages exchanged in a system according to an embodiment described herein.

FIG. 3 is an exemplary call flow diagram (ladder diagram) illustrating signaling messages exchanged in a system according to an embodiment of the subject matter described herein. This process will now be described with reference to FIGS. 1 and 3. The function of MS 118, MSC/VLR 2 108, STP 102, and HLR 110 is the same as for the like-numbered elements in FIG. 1, and their descriptions will therefore not be repeated here.

In the embodiment illustrated in FIG. 3, mobile subscriber 118 has changed location and is now in the geographical area served by BSS2 116 and MSC/VLR 2 108. MSC/VLR 2 108 receives a mobility management message from MS 108, such as a mobile subscriber registration message 300. In response to receiving registration message 300, MSC/VLR 2 108 sends an update location message 302 to the home location register that serves mobile subscriber 108, which in this example is HLR 110.

At block 304, STP 102 intercepts update location message 302, extracts information identifying mobile subscriber 118, such as the mobile subscriber's IMSI, from update location message 302. STP 102 also extracts location information associated with mobile subscriber 118, such as the MSC ID or VLR ID of MSC/VLR 2 108. In one embodiment, MS 118 may transmit its current GPS coordinates as part of registration message 300. The physical map or geo-position coordinates of mobile subscriber 118 may be derived in other ways, also. For example, if the mobile switching center manages multiple radio towers or base transceiver stations (BTSs), the location of mobile subscriber 118 may be determined by triangulation based on the distance from each tower, calculated from the round-trip delay from each tower to the mobile unit.

The extracted information identifying the mobile subscriber and location information is stored by STP 102, such as in location information cache 120. In one embodiment, LIC 120 is co-located with or is a component of STP 102. Alternatively, LIC 120 may be located remotely from STP 102 and may be accessible by the STP. For example, if LIC 120 is maintained at a service control point (SCP) separately from STP 102, STP 102 may query the external LIC SCP using SS7 transaction capabilities application part (TCAP) or other suitable application/communications protocol.

Table 1, below, illustrates exemplary information identifying a mobile subscriber and location information, such as might be stored in LIC 120 according to one embodiment of the subject matter described herein.

TABLE 1

Example Subscriber Location Information

| Subscriber ID | Serving MSC |
|---|---|
| 012349193457017 | 2121112222 |
| 567899193061599 | 2121112224 |
| 247959193061881 | 2121112223 |

Table 1 contains three records, one for each subscriber whose location is being tracked. In one embodiment, the location information associated with the mobile subscriber is the MSC ID of the serving MSC. Thus, each record in Table 1 includes a subscriber ID field, which contains the IMSI for the subscriber, and a serving MSC field, which contains the MSC ID of the MSC that is currently serving (or, in some cases, last served) mobile subscriber 118.

STP 102 then transmits an update location message 306 to HLR 110. In one embodiment, update location message 306 may be identical to update location message 302; in this case, STP 102 can be said to have simply forwarded, relayed or routed update location message 302 to HLR 100. In alternate embodiments, STP 102 may modify update location message 302 and send modified update location message 306 to HLR 110.

In response to receiving update location message 306, HLR 110 may update its information for mobile subscriber 118, such as to record the identities of the MSC and VLR currently serving MS 118. HLR 110 may then send an insert subscriber data message 308 to MSC/VLR 2 108, which includes information useful for MSC/VLR 2 108, such as service key information about what services are available to mobile subscriber 118, information about the subscriber's current pre-paid balance, if the mobile subscriber is a pre-paid subscriber, and so on.

At block 310, STP 102 intercepts insert subscriber data message 308, and again extracts and stores any information identifying the mobile subscriber and location information associated with the mobile subscriber that may be contained within insert subscriber data message 308. STP 102 then forwards, modifies and forwards, or sends new to MSC/VLR 2 108 the insert subscriber data message 312.

MSC/VLR 2 108 receives insert subscriber data message 312, and in response, sends an insert subscriber data acknowledge message 314 to HLR 110, which in turn responds with an update location acknowledge message 316. Both messages may be routed through STP 102, which may attempt to extract and store location information from each message, but which, for simplicity, is not shown in FIG. 3.

Figure 4A:
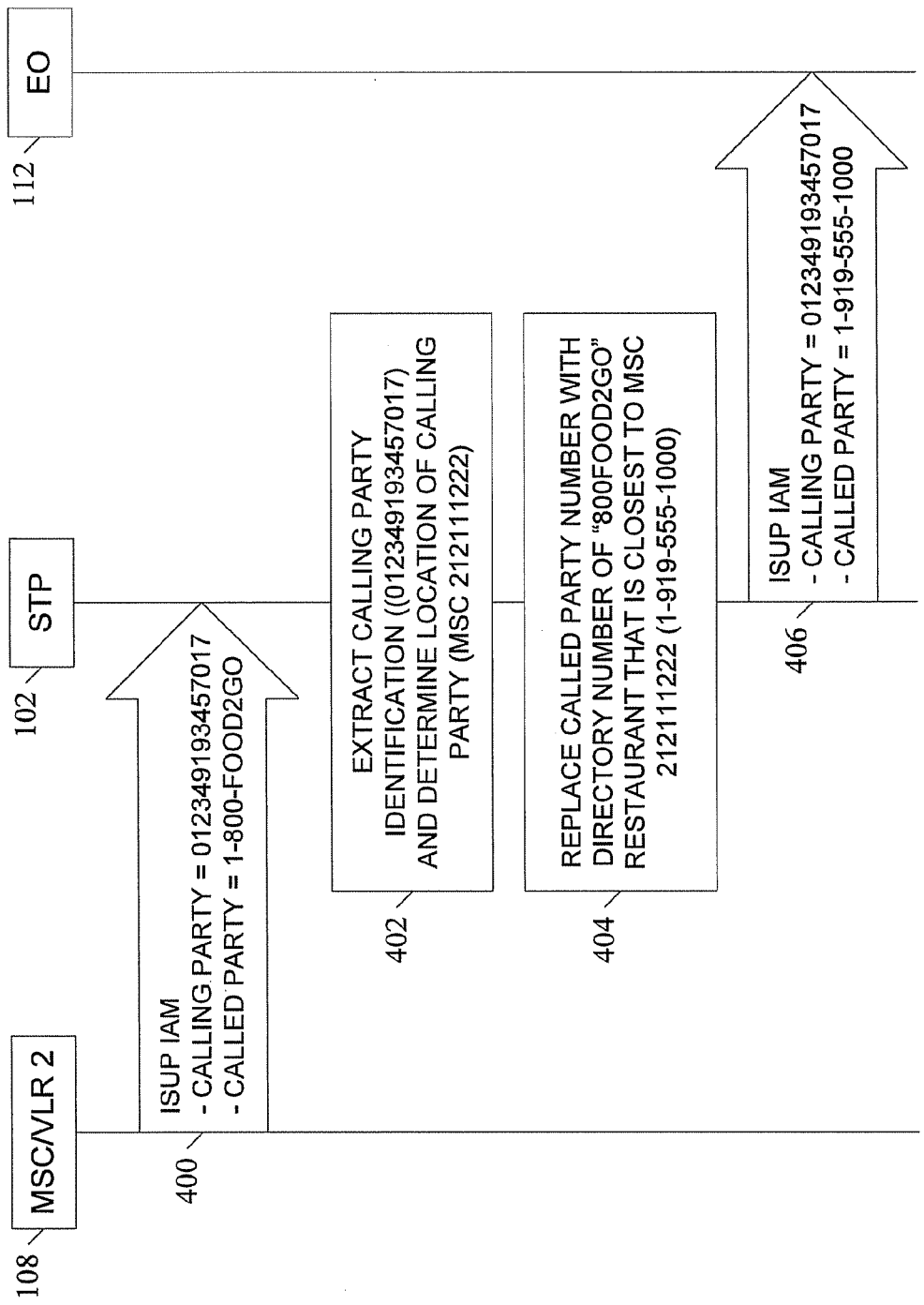
FIGS. 4A and 4B are exemplary call flow diagrams (ladder diagrams) illustrating more signaling messages exchanged in a system according to an embodiment described herein.

FIG. 4A is an exemplary call flow diagram (ladder diagram) illustrating more signaling messages exchanged in a system according to an embodiment of the subject matter described herein. The function of MSC/VLR 2 108, STP 102, and EO 112 is the same as for the like-numbered elements in FIG. 1, and their descriptions will therefore not be repeated here.

In the embodiment illustrated in FIG. 4A, a mobile subscriber, having an IMSI or other subscriber identifier of 012349193457017, is attempting to call a toll-free 1-800 number associated with a restaurant chain that has several locations from which it can deliver food, such as a pizza delivery restaurant. In this example, the restaurant chain provides the toll-free number 1-800-FOOD TO GO. When a mobile subscriber dials this number, it is desired that the mobile subscriber will be connected to the take-out restaurant location that is geographically closest to the mobile subscriber's current location, which is hopefully within the delivery area served by that particular take-out restaurant.

In order to achieve this goal, there may be location-based routing rules which route a call dialed from a mobile subscriber to the 1-800-FOOD2GO number based on the current location of the mobile subscriber. An example of these rules is illustrated in Table 2, below.

TABLE 2

Example Location-Based Routing Rules

| Target Called Number | Serving MSC | Redirect Number |
| --- | --- | --- |
| 1-800-FOOD2GO | 2121112222 | 1-919-555-1000 |
| 1-800-FOOD2GO | 2121112223 | 1-919-555-1001 |
| 1-800-FOOD2GO | 2121112224 | 1-919-555-1002 |

Table 2 contains three records, each describing a location-based routing rule. In this example table, the routing rule defines a trigger condition and an action. The trigger condition is defined by two fields, target called number and serving MSC, and the action is defined by the third field, redirect number. In an embodiment that uses these rules, for example, if a call setup message is detected that has a called party value of 1-800-FOOD2GO (1-800-366-3246), and the call setup message came from the MSC having an MSC ID of 2121112222, then the call will be routed to 1-919-555-1000. A call to 1-800-FOOD2GO that comes from an MSC with an MSC ID of 2121112224 will be redirected to 1-919-555-1002.

Referring again to FIG. 4A, the mobile subscriber dials the number 1-800-FOOD2GO. In response, MSC/VLR 2 108 may issue an ISUP IAM message 400 that includes information identifying the calling party ID as 012349193457017 and the called party as 1-800-FOOD2GO.

This message is received by STP 102, and, at block 402, STP 102 extracts calling party information, i.e., subscriber ID 012349193457017, and uses it to determine the current location of the mobile subscriber. In one embodiment, STP 102 may search Table 1, above, and determine that the mobile subscriber is currently being served by MSC 2121112222.

At block 404, STP 102 may then use the location information associated with the mobile subscriber to route the call. In the embodiment illustrated in FIG. 4, STP 102 may use the MSC ID 2121112222 to search Table 2, above, and determine that the call should be routed to 1-919-555-1000. Thus, STP 102 may change the called party parameter value from 1-800-FOOD2GO to 1-919-555-1000, and send the modified ISUP IAM message 406 to its intended destination, EO 112.

Figure 4B:
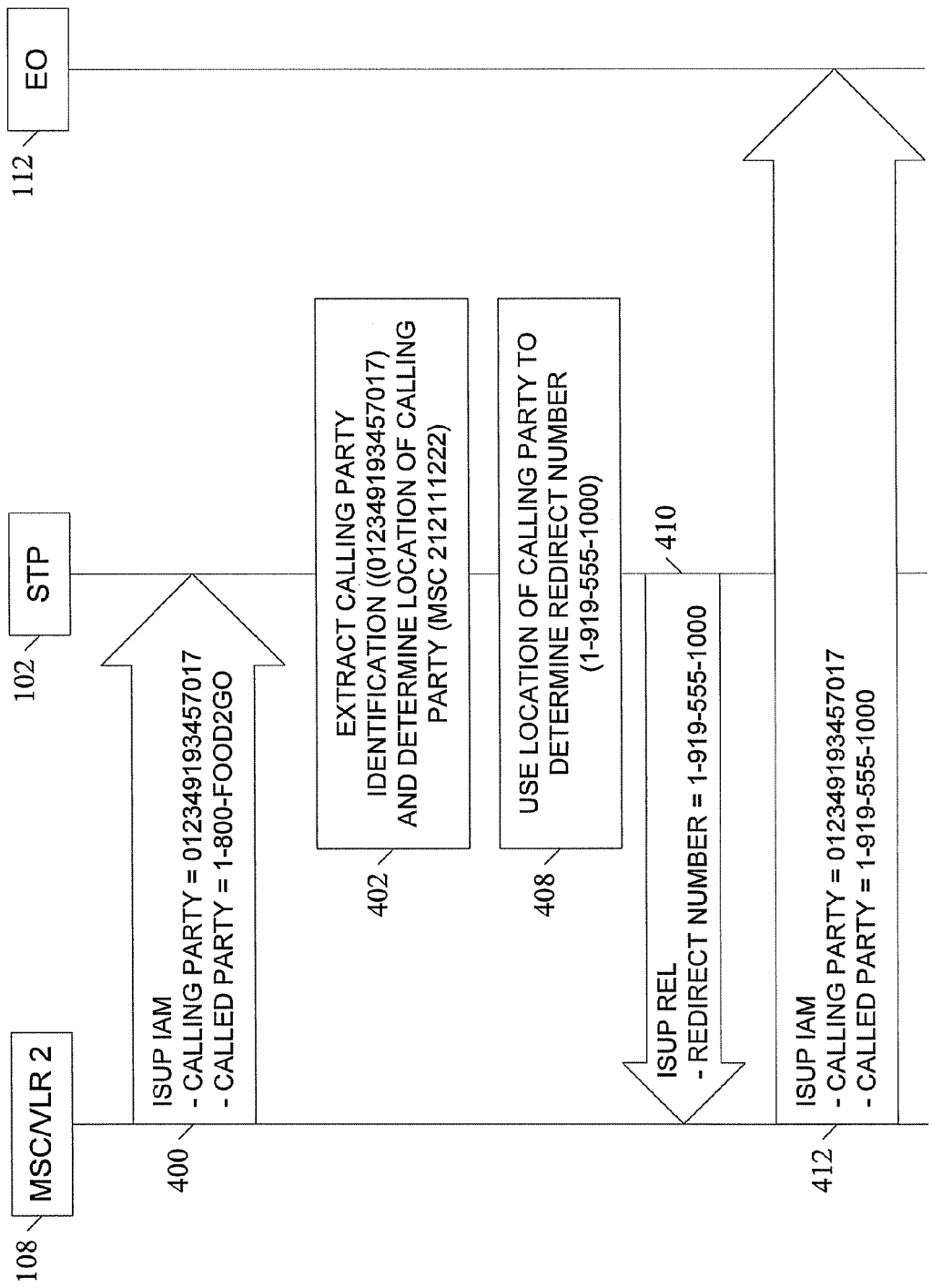

FIG. 4B is an exemplary call flow diagram (ladder diagram) illustrating more signaling messages exchanged in a system according to another embodiment of the subject matter described herein. The function messages 400 and 402 are the same as for like-numbered elements in FIG. 4A, and their descriptions also will not be repeated here.

FIG. 4B illustrates another action that STP 102 may take in response to determining the redirect number. In the embodiment illustrated in FIG. 4B, at block 408, STP 102 may use the location of the calling party to determine the redirect number, e.g., 1-919-555-1 000, and send a message to MSC/VLR 2 108 instructing it to release the current call paths reserved, if any, and redirect the call to the new number. For example, STP 102 may issue an ISUP release (REL) message 410, which may include a redirect number as a message parameter. MSC/VLR 2 108 may receive ISUP REL message 410 and issue another ISUP IAM message 412 directed to the appropriate calling party number, e.g., 1-919-555-1000. This new call setup message may or may not be routed through STP 102, depending on the called party number. In the embodiment illustrated in FIG. 4B, call setup message 412 is directed to EO 112, which serves the subscriber number 1-919-555-1000.

Although FIGS. 4A and 4B show LIC 120 co-located with STP 102, the subject matter described herein is not so limited. For example, LIC 120 or its equivalent function may be located in an HLR, an Internet protocol multimedia subsystem (IMS) home subscriber server (HSS), a redirect server, a location server (LS), a presence server (PS), or other network element or node within a telecommunication network.

Although the embodiment illustrated in FIG. 1 is a deployment in a 2G network, equivalent embodiments may be deployed in other types of networks, including IS41 cellular networks and 3G or 3G+ networks, such as SIP networks, IMS networks, and next-generation networks (NGNs). For example, a deployment in a SIP network will now be described using FIGS. 5A and 5B.

Figure 5A:
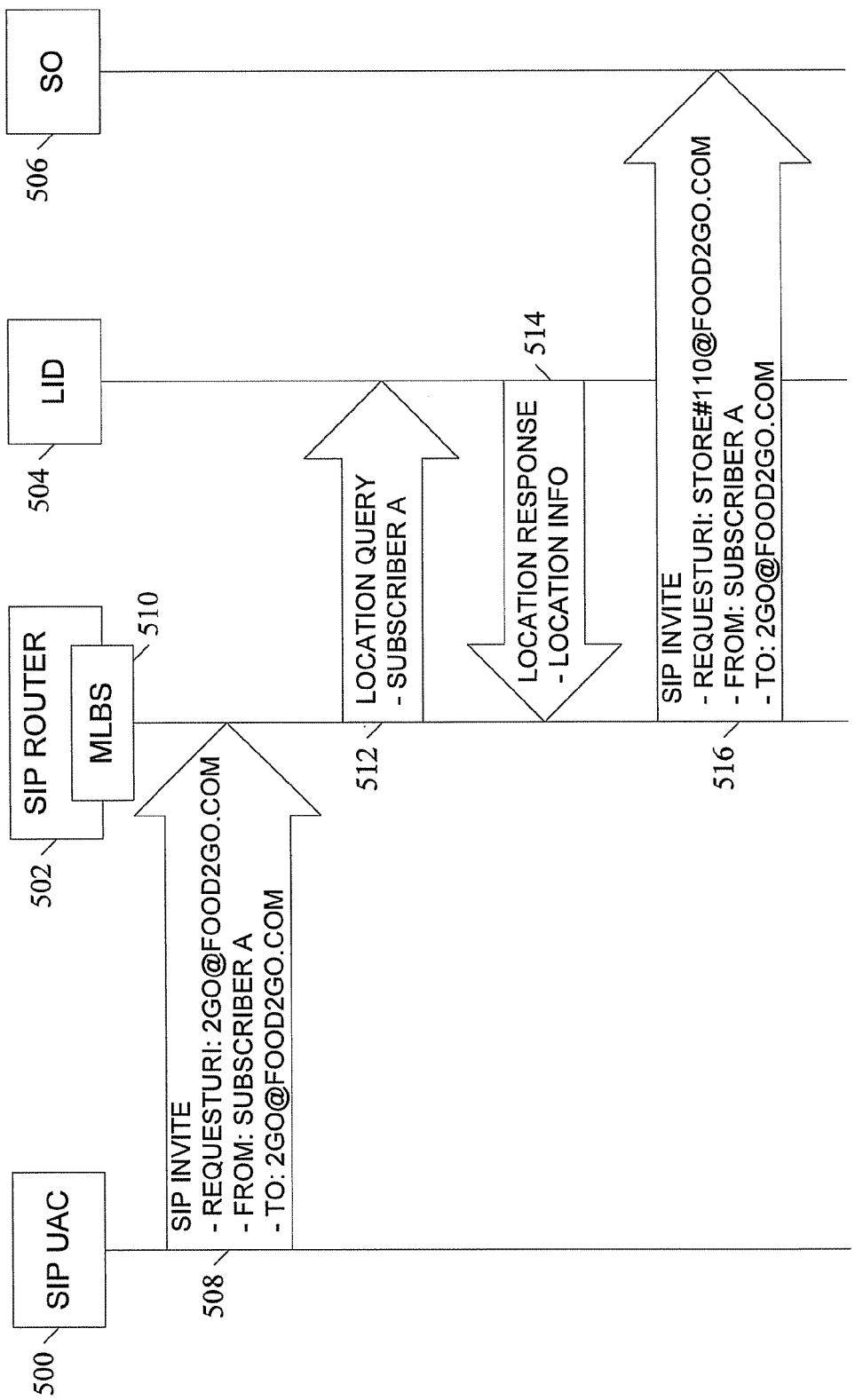
FIGS. 5A and 5B are exemplary call flow diagrams (ladder diagrams) illustrating more signaling messages exchanged in a system according to another embodiment described herein.

FIG. 5A an exemplary call flow diagram (ladder diagram) illustrating signaling messages exchanged in a SIP-based system according to another embodiment of the subject matter described herein.

In the embodiment illustrated in FIG. 5A, SIP user agent client (UAC) 500 is a subscriber in a SIP network that contains a SIP router 502, a location information database (LID) 504, and a switching office (SO) 506. SIP UAC 500 issues a SIP INVITE message 508, which is addressed to the uniform resource identifier (URI) 2go@food2go.com. In alternative embodiments, LID 504 may be maintained in or co-located with other network nodes, such as in a home subscriber server (HSS), a Home Location Register (HLR), a SIP location server (LS), a Presence server (PS), or other network database that maintains location information associated with a mobile subscriber. SIP INVITE message 508 includes parameters indicating that the message was sent from subscriber A and originally addressed to 2go@food2go.com.

The SIP invite message is received by SIP router 502, which, in alternative embodiments, may be a SIP proxy, a SIP router, a SIP application server, or a call session control function (CSCF) node. In one embodiment, SIP router 502 includes a mobile location-based screening/routing function (MLBS) 510 for performing screening and/or routing of SIP messages based on the location of a mobile subscriber associated with the SIP message. In the embodiment illustrated in FIG. 5A, MLBS 510 extracts the subscriber information from message 508 and performs a location query. For example, MLBS 510 may direct SIP router 502 to send to LID 504 a query message 512 including information identifying the subscriber, e.g., subscriber A, and receives from LID 504 a query response message 514 that includes location information for subscriber A.

SIP router 502 then determines a new RequestURI value based on the location of subscriber A, and sends a new or modified SIP invite message 516, in which the original RequestURI value, e.g., 2go@food2go.com, is replaced with the URI of the takeout restaurant location that is nearest to subscriber A, e.g., store#110@food2go.com. SIP invite message 516 is sent to the appropriate destination, which in this example is switching office 506.

Figure 5B:
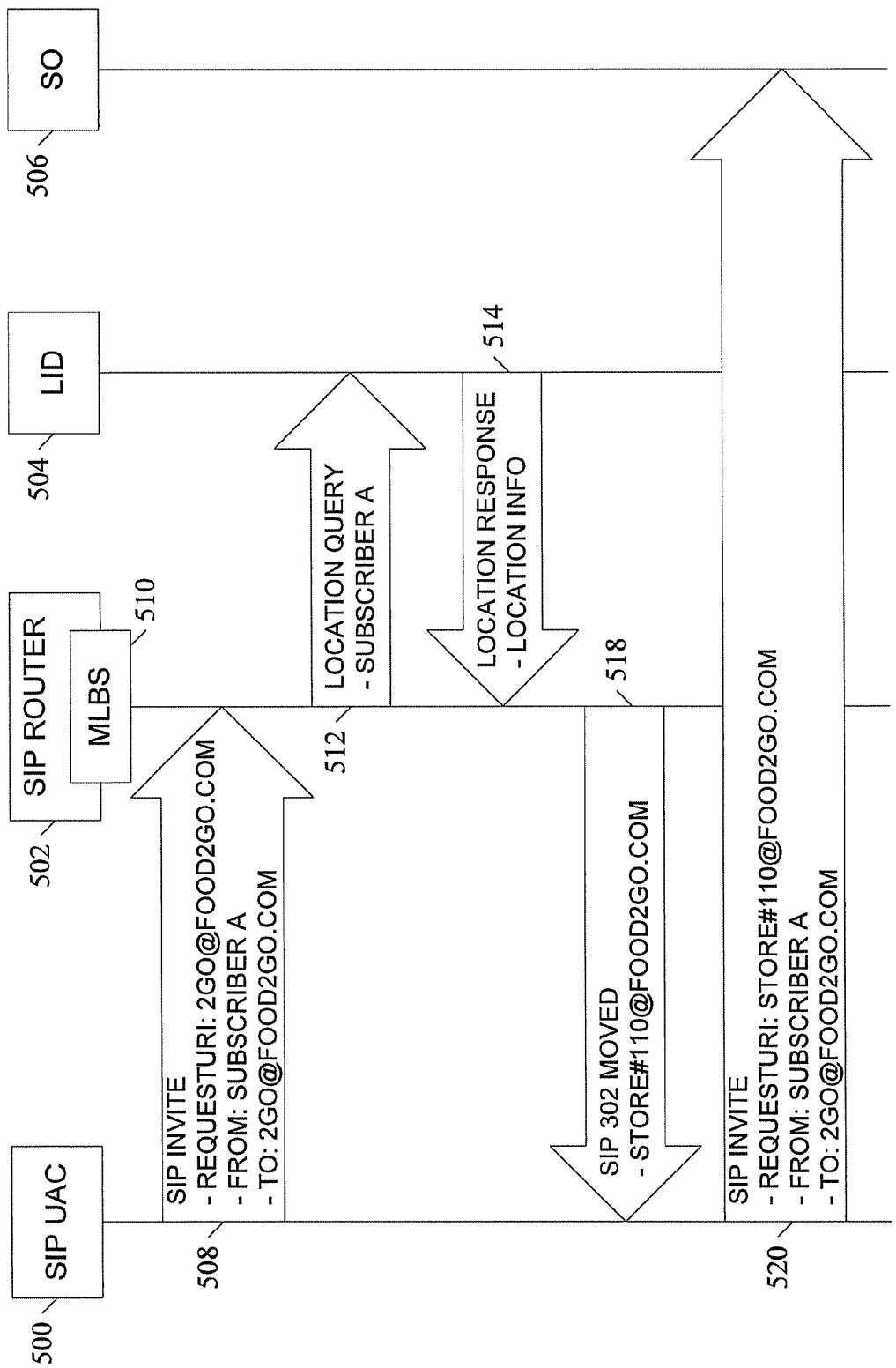

FIG. 5B an exemplary call flow diagram (ladder diagram) illustrating signaling messages exchanged in a SIP-based system according to yet another embodiment of the subject matter described herein. The function messages 508, 512, and 514 are the same as for like-numbered elements in FIG. 5A, and their descriptions will not be repeated here.

FIG. 5B illustrates another action that MLBS 510 may take in response to determining the location information for mobile subscriber A. In the embodiment illustrated in FIG. 5B, SIP router 502 may issue a message indicating that the called party has moved and indicating the calling party's new address. For example, SIP router 502 may issue a SIP 302 MOVED message 518 that includes the URI for the takeout restaurant that is closest to subscriber A's location, e.g., store #100. Thus, SIP 302 message 518 includes the parameter store#110@food2go.com. In response to receiving SIP 302 message 518, SIP UAC 500 may then issue a new SIP invite message 520 that is directed to the URI store#110@food2go.com. In one embodiment, the original URI, 2go@food2go.com, may be stored for future reference in another parameter, such as the to: parameter within SIP invite message 520.

In yet another embodiment, MLBS 510 may perform a screening function. For example, MLBS 510 may obtain location information for a mobile subscriber and reject or block a call to or from the mobile subscriber based on the mobile subscriber's location. In one embodiment, MLBS 510 may prevent a mobile subscriber from sending and/or receiving calls while the mobile subscriber is out of the subscriber's home network. This feature may be useful to prevent a mobile subscriber from accidently making an out-of-network call and thus may prevent the mobile subscriber from incurring out-of-network or roaming charges. In another embodiment, MLBS 510 may block calls made to a mobile subscriber if the mobile subscriber is in a location where cell phone use is prohibited or discouraged, such as on hospital grounds, in church, attending a play at a theatre, etc.

In another embodiment, MLBS 510 may prevent a mobile subscriber from making a call to a called party that is not in the same geographic area as the mobile subscriber. Alternatively, MLBS 510 may prevent a mobile subscriber from receiving a call from a calling party that is not in the same geographic area as the mobile subscriber, or from a calling party that originates from a location outside of the subscriber's network.

Although the scenarios above are described in the context of the SIP network of FIGS. 5A and 5B, the same functions may be performed in other networks, such as the SS7 network of FIG. 1. For example, the screening functions described above may be performed by STP 102. Similarly, STP 102 may also contain a mobile location-based screening and routing module such as MLBS 510. In one embodiment, STP 102 is adapted to receive an SS7 call setup message (e.g., ISUP IAM), to extract calling party identification information from the message, and to use the calling party identification information to query a location register (e.g., HLR, HSS, Presence server)/location server so as to obtain location information associated with the calling party. The obtained location information is then used to determine how or where the call should be routed. In a GSM networking environment, STP 102 may utilize, for example, a send_routing_information or anytime_interrogation message to obtain location calling party location information. Other application or communication protocols may be also used by STP 102 to obtain location information associated with the calling party. This "direct query" type embodiment of the present invention may be used alone or in combination with the "intercept-cache" embodiments previously described to provide location-based call routing services according to embodiments of the subject matter described herein. In alternative embodiments, the triggerless mobile location-based screening and routing functions may be performed by an advanced routing server, such as a service control point (SCP), a SIP server, a service capability interaction manager (SCIM), or other node in a telecommunications network.

In one embodiment, the location information database and/or the triggerless mobile location-based screening and routing functions may be made available to other nodes in the telecommunications network. For example, by locating these functions in an SCP, service switching points (SSPs), MSCs, STPs, or other switching or routing nodes may also obtain mobile location-based services such as those described above. Likewise, the location information database or mobile location-based screening and routing functions could be co-located with or be a component of a media gateway controller, a softswitch, a border gateway control function, a session border controller (SBC), a signaling gateway (SG), etc.

In alternative embodiments, other signaling transactions and methods may be used to facilitate triggerless mobile location-based screening and routing according to the subject matter described herein, including transactions involving IMS entities, SIP entities, 2G cellular (e.g., GSM, IS41) entities, 3G entities, NGN entities, and with other telecommunications entities.

Figure 6:
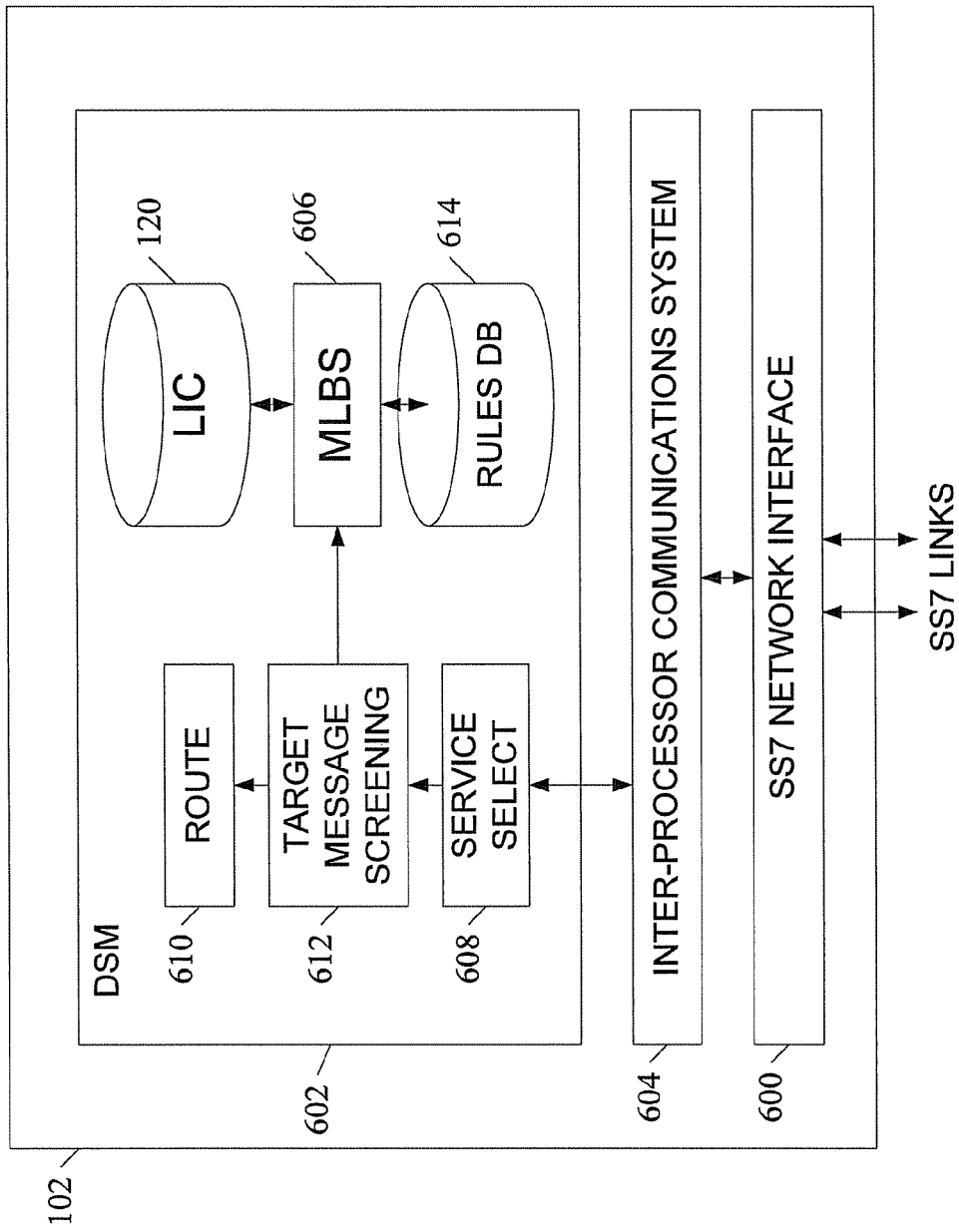
FIG. 6 is a block diagram illustrating an exemplary telecommunications network element according to an embodiment of the subject matter described herein.

FIG. 6 is a block diagram illustrating an exemplary telecommunications network element according to an embodiment of the subject matter described herein. In the embodiment illustrated in FIG. 6, telecommunications network element 102 is an STP that also includes location information database LIC 120.

In the embodiment illustrated in FIG. 6, STP 120 may include an SS7 network interface module 600 and a database services module (DSM 602), which communicate with each other via an inter-processor communications system 604. Each module 600, 602, and 604 may include a printed circuit board, an application processor for performing application level processing of signaling messages, and a communications processor for controlling inter-processor communications via inter-processor communications system 604. Inter-processor communications system 604 may be any suitable mechanism for providing message communication between modules 600, 602, and 604. For example, inter-processor communications system 604 may be a bus, an Ethernet LAN, or any other suitable mechanism for providing communications between processors. In the embodiment illustrated in FIG. 6, SS7 network interface 600 may be connected to one or more SS7 links.

DSM 602 may include various functions and databases for processing signaling messages. In the illustrated example, DSM 602 incorporates a mobile location-based screening and routing module MLBS 606 and location information database 120. The function of MLBS 606 is substantially identical to the function of MLBS 510, described with reference to FIG. 5, above, and the function of LIC 120 is substantially identical to the like-numbered element described with reference to FIG. 1, above; therefore, their descriptions will not be repeated here.

Within DSM 602, service selection function 6086 receives messages from the interface processors and determines the type of service required for each message. For example, service selection function 608 may determine whether further screening of messages is required or whether the messages are simply to be global title translated and routed using route function 610. In one embodiment, service selection function 608 may forward all messages to target message screening function 612. Target message screening function 612 may send ISUP IAM or SAM messages to MLBS 606 for processing.

In the embodiment illustrated in FIG. 6, MLBS 606 may extract the information identifying a mobile subscriber and the location information associated with the mobile subscriber from mobility management messages that it receives from target message screening function 612 and store the extracted information in LIC 120. MLBS 606 may also extract information identifying a mobile subscriber from call setup messages that it receives from target message screening function 612 and use that information to retrieve location information for the mobile subscriber from LIC 120. MLBS 606 may then use the mobile subscriber's location information to perform screening or routing functions according to screening or routing rules stored in a database, rules DB 614.

Figure 7:
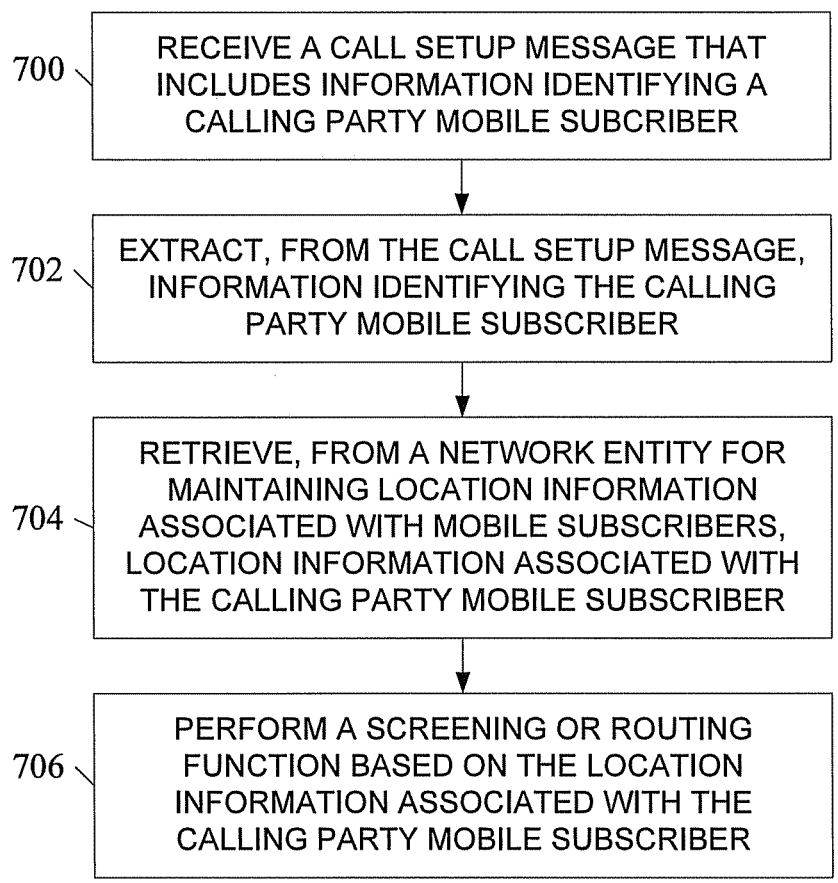
FIG. 7 is a flow chart illustrating an exemplary process for triggerless mobile location-based routing/screening according to another embodiment of the subject matter described herein.

FIG. 7 is a flow chart illustrating an exemplary process for triggerless mobile location-based routing/screening according to another embodiment of the subject matter described herein. At block 700, a call setup message is received or intercepted by the telecommunications network element. For example, STP 102 may receive a call setup message originated by mobile subscriber 118 through BSS2 116. Examples of call setup messages include an ISDN service user part (ISUP) initial address message (IAM), a session initiation protocol (SIP) invite message, etc. At block 702, information identifying the calling party mobile subscriber is extracted from the call setup message. At block 704, the location information associated with the calling party mobile subscriber is determined. For example, STP 102 may query a home location register (HLR) or home subscriber server (HSS) to get location information associated with the calling party mobile subscriber. At block 706, a screening or routing function is performed, based on the location information associated with the calling party mobile subscriber.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for performing triggerless mobile location-based screening and routing, the method comprising:
   at a telecommunications network routing node separate from a home location register (HLR) and a visitor location register (VLR) and being located in a communication path between the HLR and the VLR:
   receiving a mobility management message transmitted between the HLR and the VLR and associated with a mobile subscriber, extracting from the mobility management message information identifying the mobile subscriber and location information associated with the mobile subscriber, and storing the extracted location information associated with the mobile subscriber; and
   receiving a call setup message associated with a call from the mobile subscriber, extracting from the call setup message information identifying the mobile subscriber, providing the stored location information associated with the mobile subscriber on behalf of the HLR, and performing a screening or routing function based on the location information associated with the mobile subscriber,
   wherein performing a screening function based on the location information associated with the mobile subscriber comprises allowing or denying a call based on the location of the mobile subscriber.

2. The method of claim 1 wherein the telecommunications network routing node comprises one of a signaling system 7 (SS7) signaling message routing node, a session initiation protocol (SIP) node, an Internet protocol (IP) node, an IP multimedia subsystem (IMS) node, a next generation network (NGN) node, and a signaling gateway node.

3. The method of claim 2 wherein the telecommunications network routing node comprises one of an SS7 signal transfer point (STP), an SS7 service switching point (SSP), a mobile switching center (MSC), a media gateway controller (MGC), an IMS call session control function (CSCF) node, a SIP proxy server, a SIP router, and a SIP/SS7 gateway, a media gateway controller (MGC), and a softswitch.

4. The method of claim 1 wherein storing the information identifying the mobile subscriber and location information associated with the mobile subscriber comprises storing the information within the routing node or at a network entity separate from the routing node, the HLR, and the VLR.

5. The method of claim 1 wherein the information identifying the mobile subscriber comprises at least one of an international mobile subscriber identity (IMSI), an electronic serial number (ESN), a mobile equipment identifier (MEID), and a mobile subscriber integrated services digital network (ISDN) number (MSISDN).

6. The method of claim 1 wherein the mobility management message comprises a signaling system 7 (SS7) mobile application part (MAP) message.

7. The method of claim 6 wherein the SS7 MAP message comprises one of an update location message, an insert subscriber data message, an any time interrogation message, a provide subscriber info message, and a send routing information message.

8. The method of claim 1 wherein the location associated with the mobile subscriber comprises at least one of a mobile switching center identifier (MSC ID), a visitor location register identifier (VLR ID), global positioning system (GPS) coordinates for the mobile subscriber, GPS coordinates for an MSC currently serving the mobile subscriber, a location area code (LAC), a cell identifier (CID), location information for a radio network element, a radio network element identifier, a geo-position of the mobile subscriber, and a physical map of the mobile subscriber.

9. The method of claim 1 wherein storing the extracted location information associated with the mobile subscriber comprises storing the information in at least one of a cache, a database, a lookup table, a data structure, a data store, and a memory location.

10. The method of claim 1 wherein the call setup message comprises one of an integrated services digital network (ISDN) user part (ISUP) initial address message (IAM) and a session initiation protocol (SIP) invite message.

11. The method of claim 1 wherein performing a routing function based on the location information associated with the mobile subscriber comprises determining a new destination based on the location of the mobile subscriber, and one of:
   modifying and forwarding the received call setup message or sending a new call setup message to the new destination; and
   sending, to the sender of the call setup message, a release message that includes information identifying the new destination.

12. The method of claim 11 wherein, in response to receiving the release message, the sender of the call setup message generates another call setup message that is directed to the new destination.

13. A system for performing triggerless mobile location-based screening and routing, the system comprising:
   a telecommunications network routing node separate from a home location register (HLR) and a visitor location register (VLR) and being located in a communication path between the HLR and the VLR, the routing node for:
  receiving a mobility management message transmitted between the HLR and the VLR and associated with a mobile subscriber, extracting information identifying the mobile subscriber and location information associated with the mobile subscriber from the message, and storing the extracted location information associated with the mobile subscriber; and
  receiving a call setup message associated with a call from the mobile subscriber, providing the stored location information associated with the mobile subscriber on behalf of the HLR, and performing a screening or routing function based on the location information associated with the mobile subscriber,
  wherein performing a screening function based on the location information associated with the mobile subscriber comprises allowing or denying a call based on the location of the mobile subscriber.

14. The system of claim 13 comprising a location information storage module, used by the telecommunications network routing node, for storing and retrieving location information associated with mobile subscribers.

15. The system of claim 13 wherein the telecommunications network routing node comprises one of a signaling system 7 (SS7) signaling message routing node, a session initiation protocol (SIP) node, an Internet protocol (IP) node, an IP multimedia subsystem (IMS) node, a next generation network (NGN) node, and a signaling gateway node.

16. The system of claim 13 wherein the telecommunications network routing node comprises one of an SS7 signal transfer point (STP), an IMS call session control function (CSCF) node, a SIP proxy server, a SIP router, a SIP/SS7 gateway, a media gateway controller (MGC), and a softswitch.

17. The system of claim 13 wherein the information identifying the mobile subscriber and location information associated with the mobile subscriber is stored within the routing node or at a network entity separate from the routing node, the HLR, and the VLR.

18. The system of claim 13 wherein the information identifying the mobile subscriber comprises at least one of an international mobile subscriber identity (IMSI), an electronic serial number (ESN), a mobile equipment identifier (MEID), and a mobile subscriber integrated services digital network (ISDN) number (MSISDN).

19. The system of claim 13 wherein the mobility management message comprises a signaling system 7 (SS7) mobile application part (MAP) message.

20. The system of claim 13 wherein the SS7 MAP message comprises one of an update location message, an insert subscriber data message, an any time interrogation message, a provide subscriber info message, and a send routing information message.

21. The system of claim 13 wherein the location associated with the mobile subscriber comprises at least one of a mobile switching center identifier (MSC ID), a visitor location register identifier (VLR ID), global positioning system (GPS) coordinates for the mobile subscriber, GPS coordinates for a mobile switching center currently serving the mobile subscriber, a location area code (LAC), a cell identifier (CID), location information for a radio network element, a radio network element identifier, a geo-position of the mobile subscriber, and a physical map of the mobile subscriber.

22. The system of claim 13 wherein the location information storage module comprises at least one of a cache, a database, a lookup table, a data structure, a data store, and a memory location.

23. The system of claim 13 wherein the call setup message comprises one of an integrated services digital network (ISDN) user part (ISUP) initial address message (IAM) and a session initiation protocol (SIP) invite message.

24. The system of claim 13 wherein performing a routing function based on the location information associated with the mobile subscriber comprises determining a new destination based on the location of the mobile subscriber, and one of:
  modifying and forwarding the received call setup message or sending a new call setup message to the new destination; and
  sending, to the sender of the call setup message, a release message that includes information identifying the new destination.

25. The system of claim 24 wherein, in response to receiving the release message, the sender of the call setup message generates another call setup message that is directed to the new destination.

26. A non-transitory computer readable medium having stored thereon executable instructions that when executed by the processor of a computer control the computer to perform steps comprising:
  at a telecommunications network routing node separate from a home location register (HLR) and a visitor location register (VLR) and being located in a communication path between the HLR and the VLR:
    receiving a mobility management message transmitted between the HLR and the VLR and associated with a mobile subscriber, extracting from the mobility management message information identifying the mobile subscriber and location information associated with the mobile subscriber, and storing the extracted location information associated with the mobile subscriber; and
    receiving a call setup message associated with the mobile subscriber, extracting from the call setup message information identifying the mobile subscriber, providing the stored location information associated with the mobile subscriber on behalf of the HLR, and performing a screening or routing function based on the location information associated with the mobile subscriber,
    wherein performing a screening function based on the location information associated with the mobile subscriber comprises allowing or denying a call based on the location of the mobile subscriber.

* * * * *